H. H. HARDINGE.
TYPE CASTING MACHINE.
APPLICATION FILED JULY 23, 1907.
926,740.
Patented July 6, 1909.
14 SHEETS—SHEET 6.
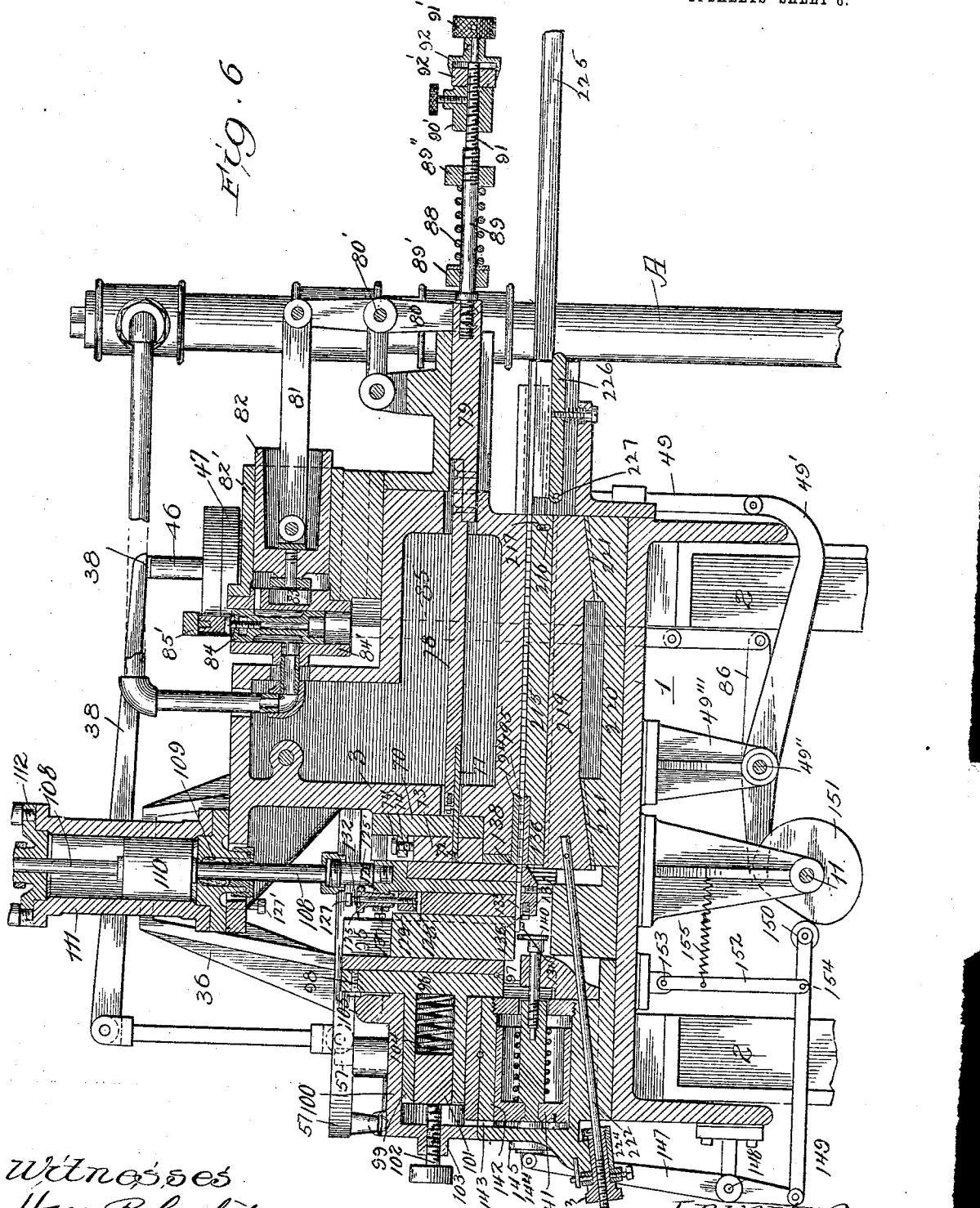
Witnesses
Harry R Lewhite
M. A. Kiddis
Inventor
Henry H. Hardinge
By Wm T Bela
Atty.

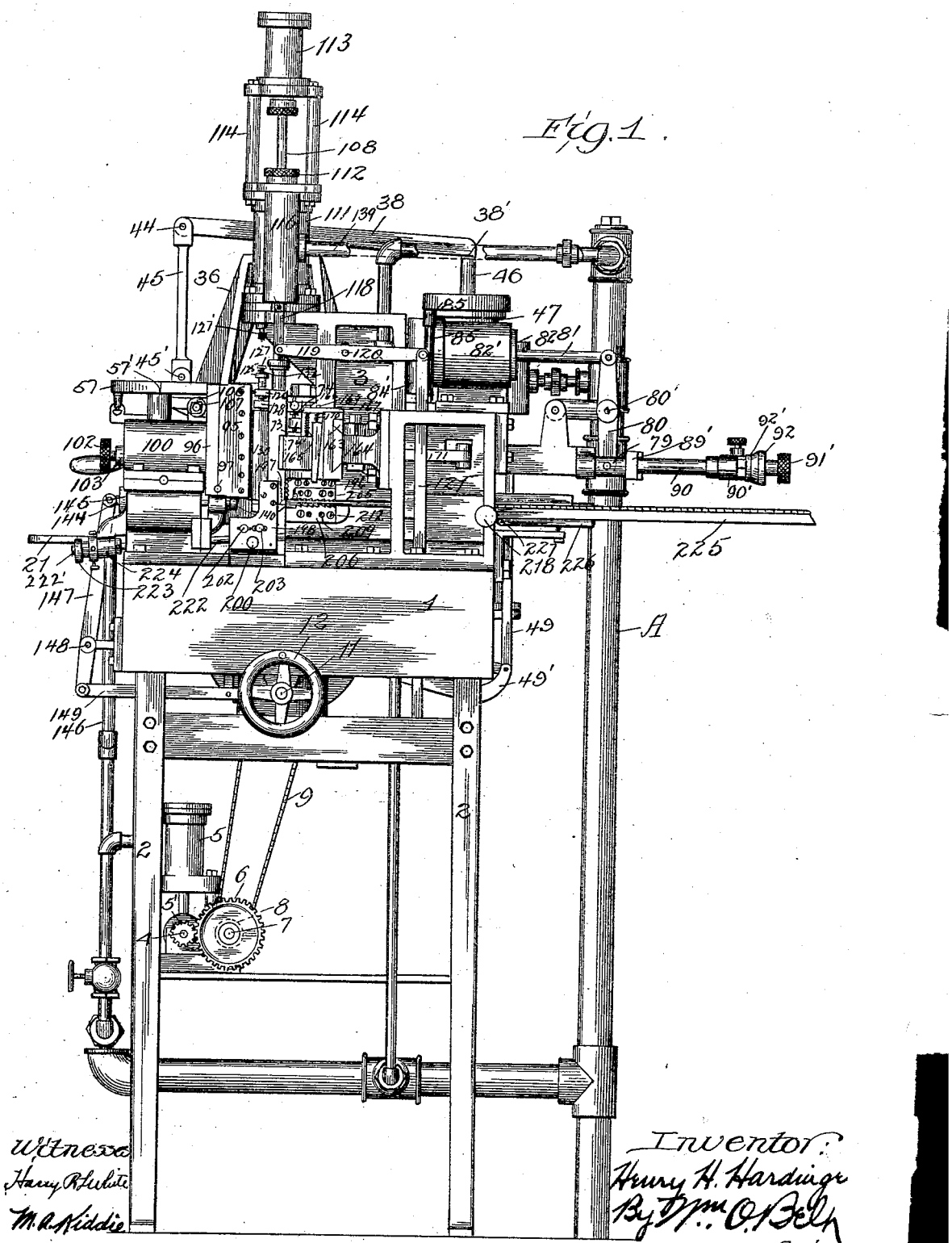

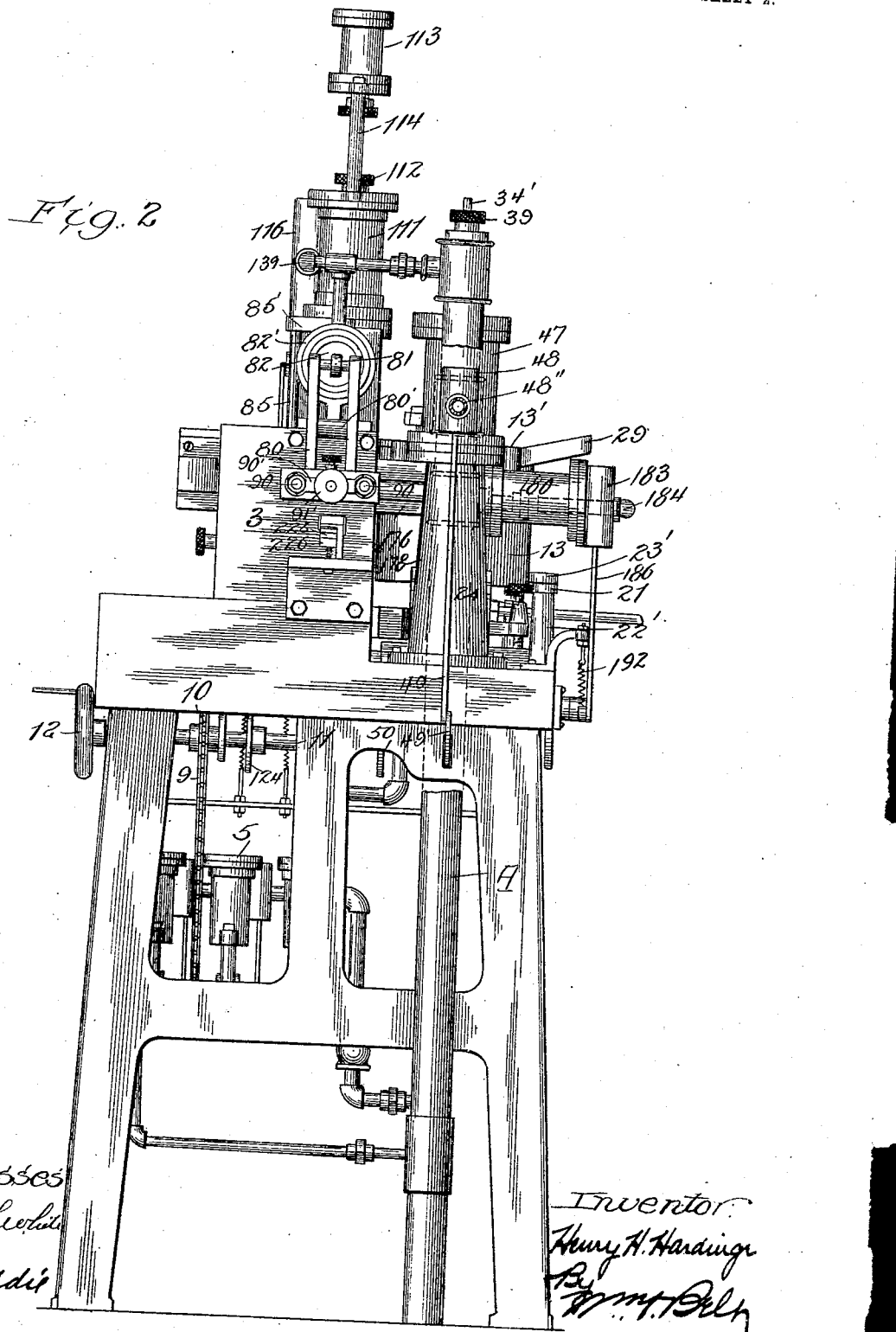

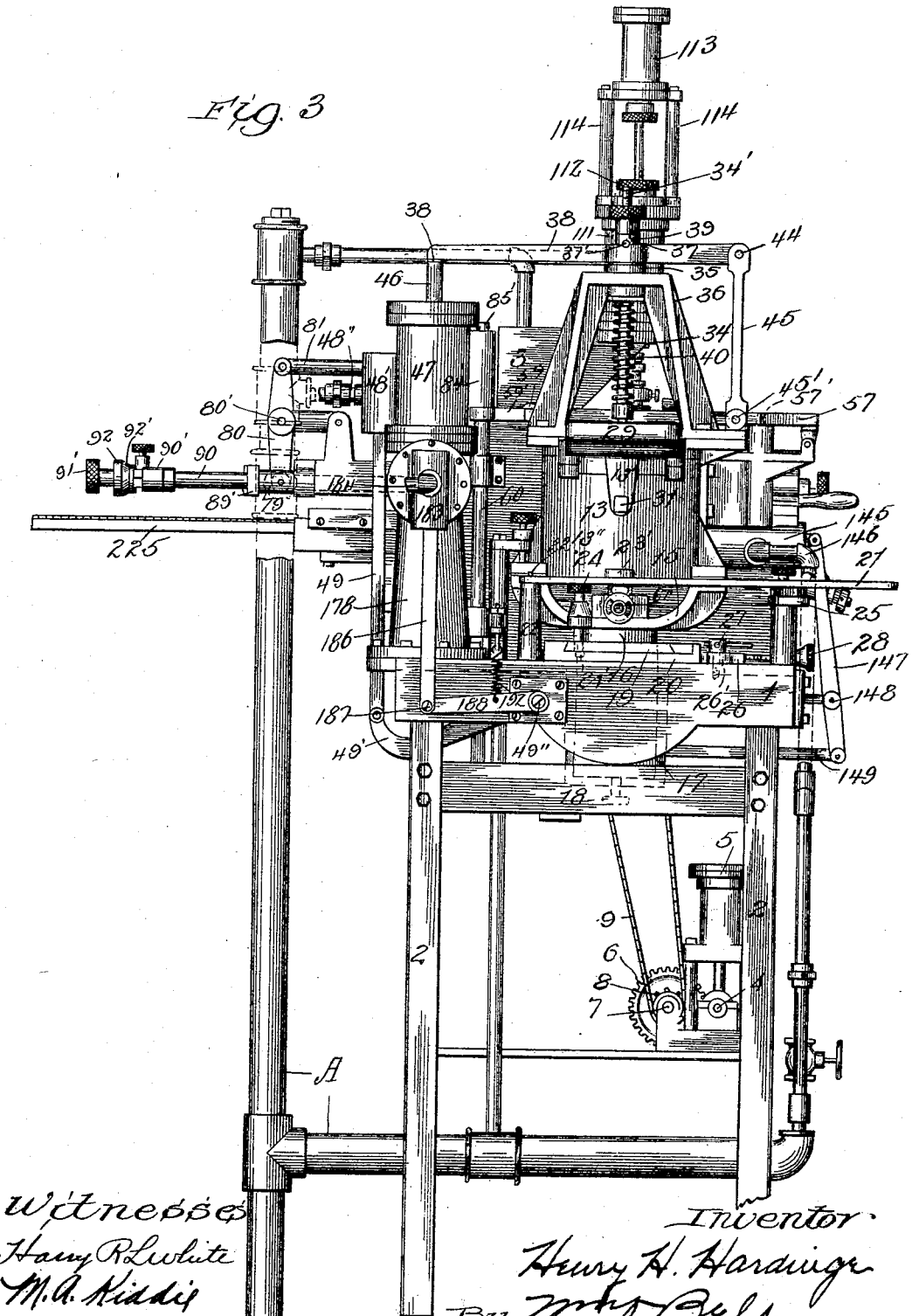

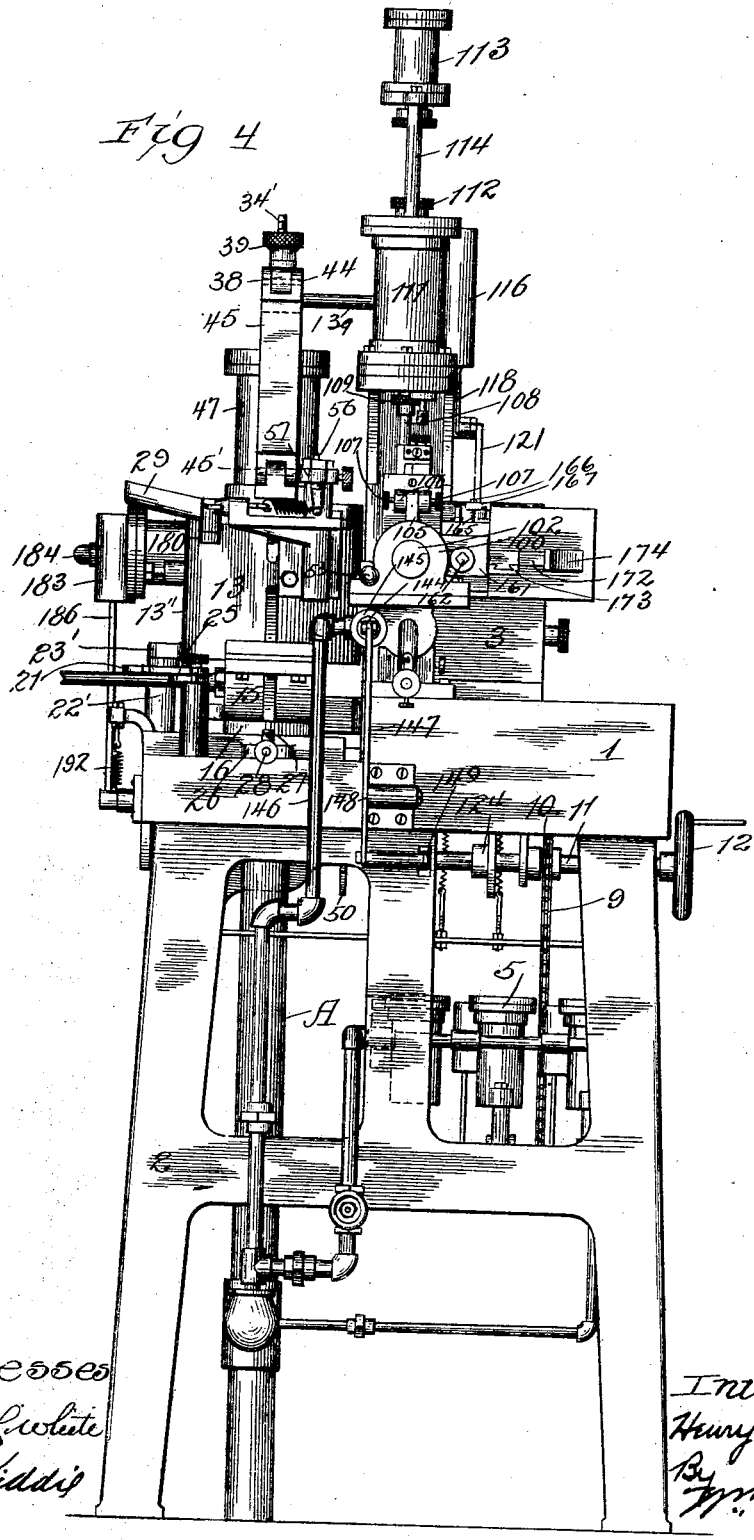

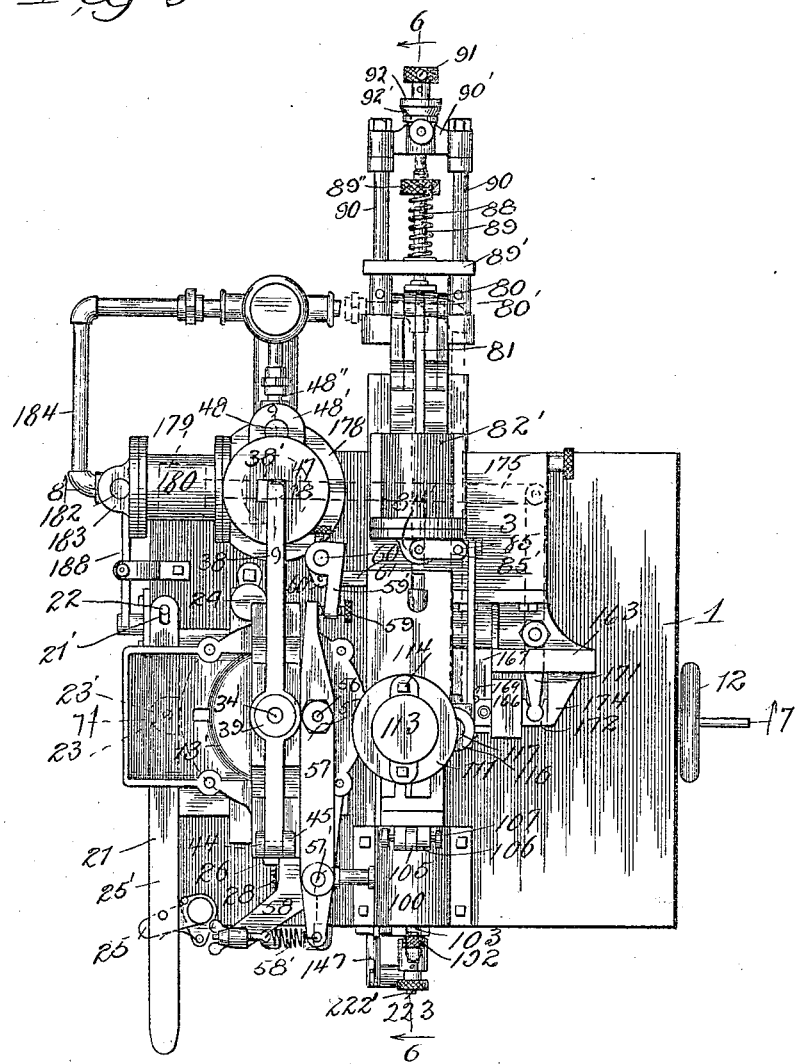

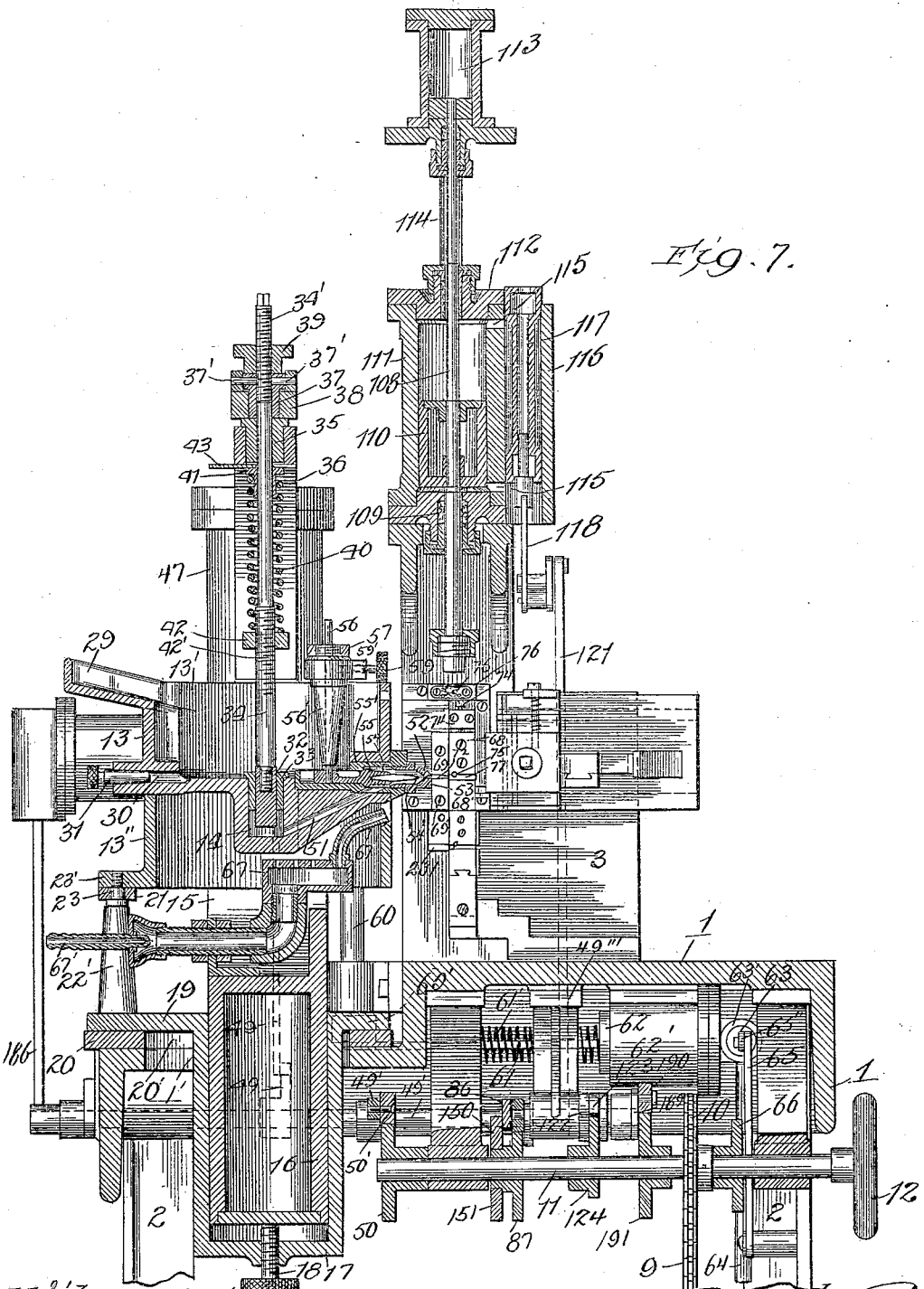

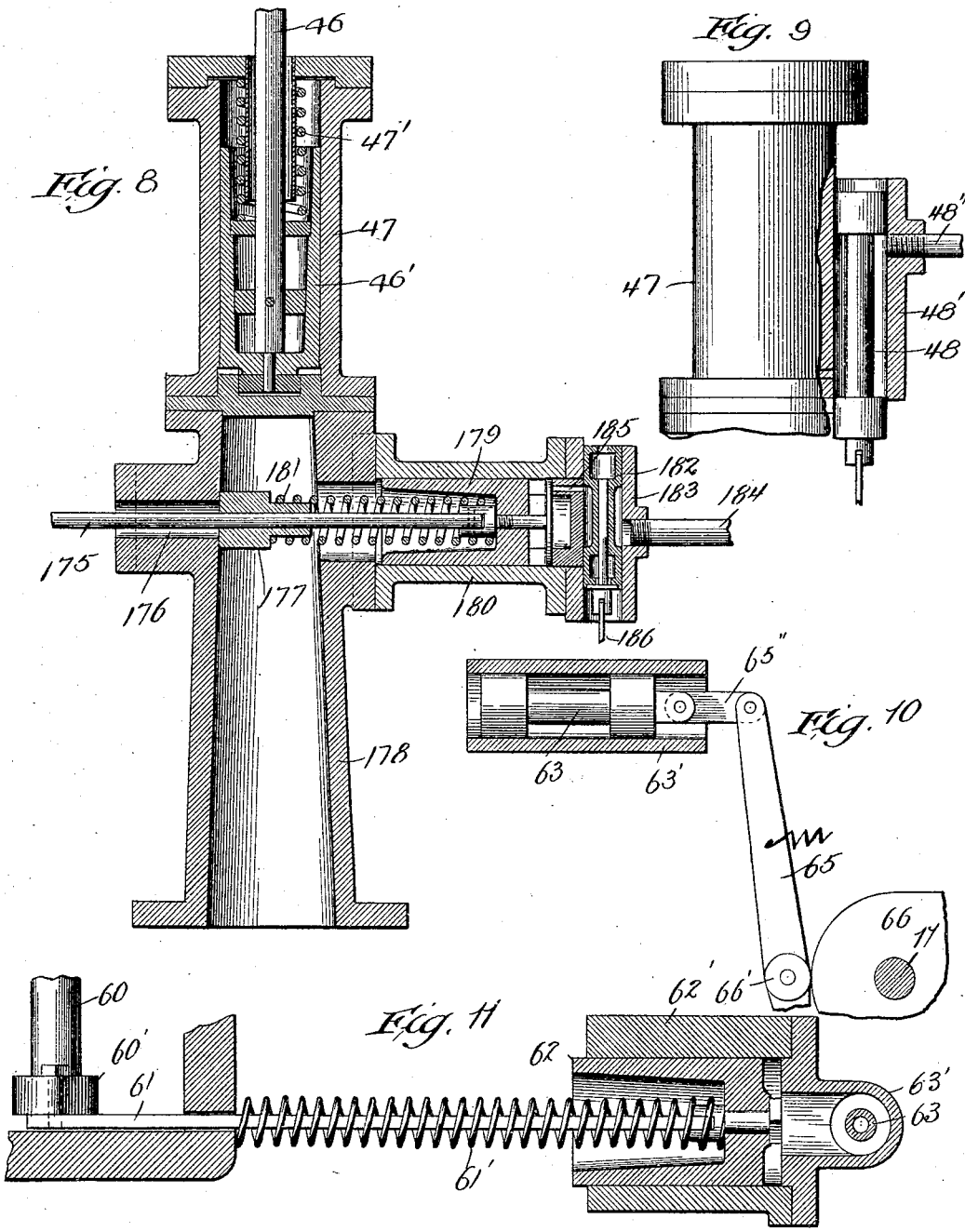

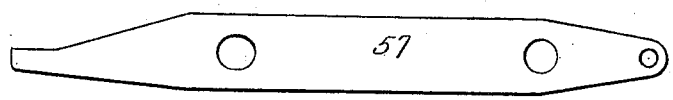

H. H. HARDINGE.
TYPE CASTING MACHINE.
APPLICATION FILED JULY 23, 1907.
926,740.
Patented July 6, 1909.
14 SHEETS—SHEET 10.
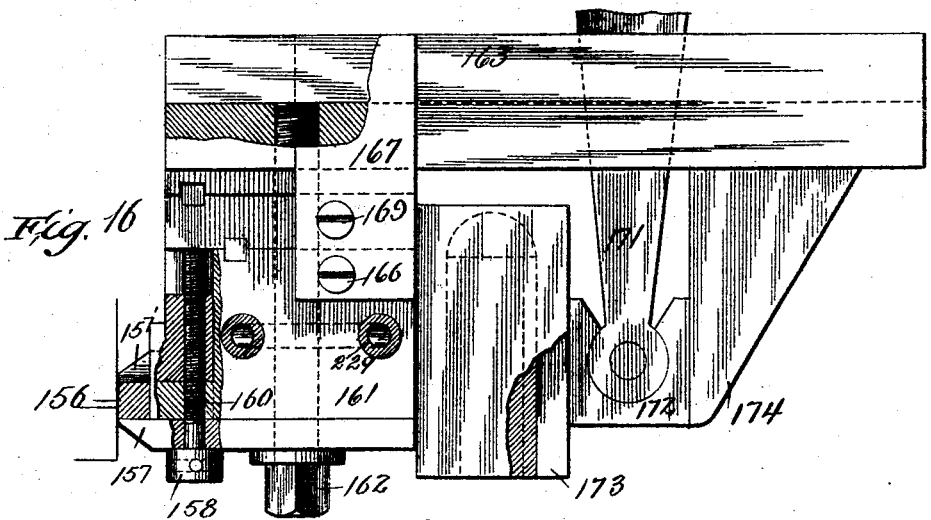
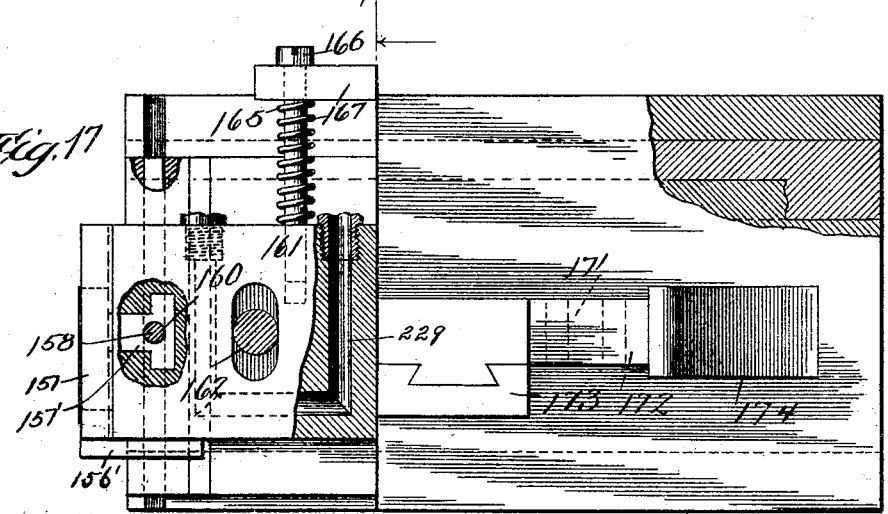
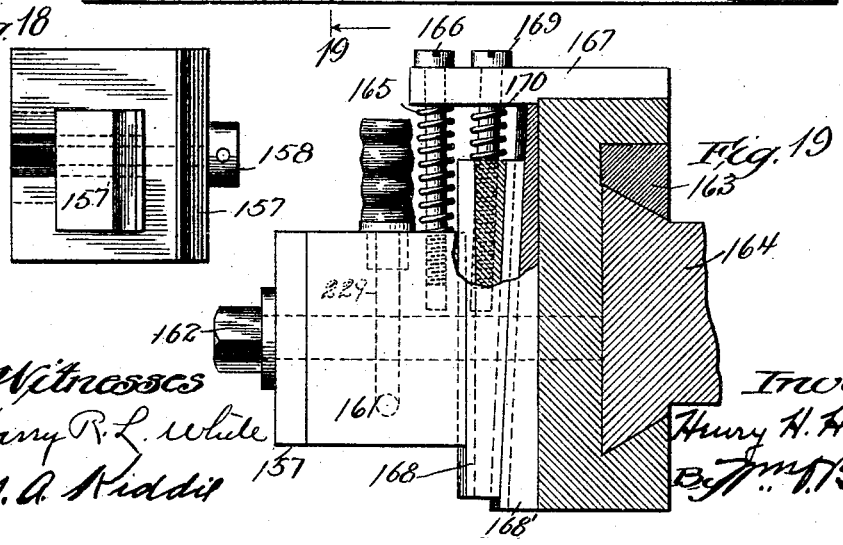

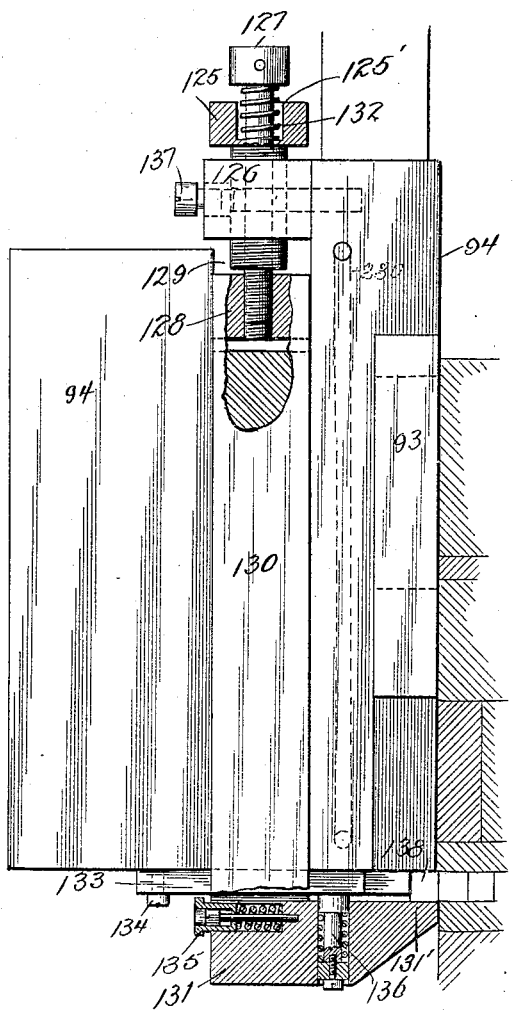
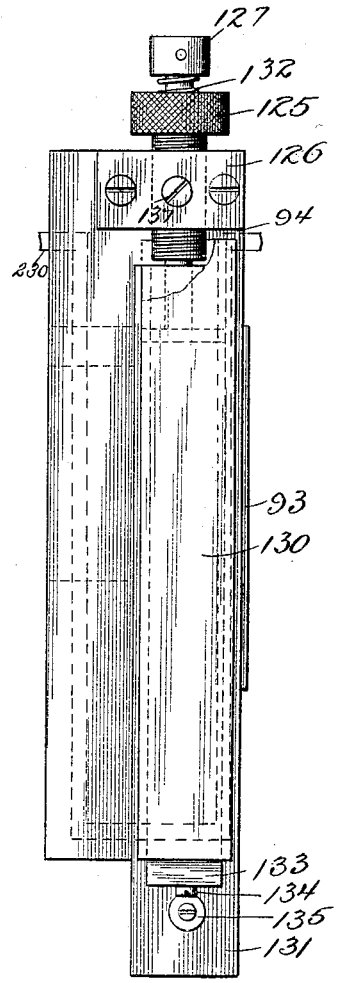
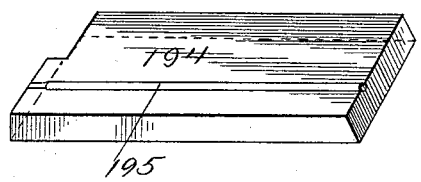

H. H. HARDINGE.
TYPE CASTING MACHINE.
APPLICATION FILED JULY 23, 1907.
926,740.
Patented July 6, 1909.
14 SHEETS—SHEET 12.
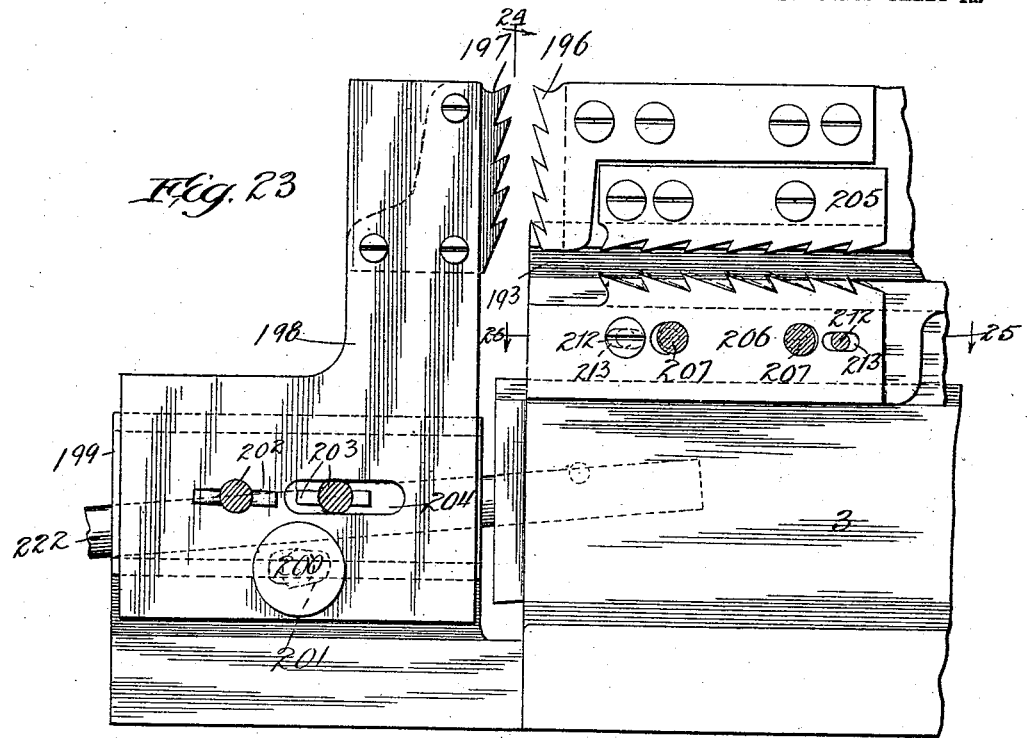
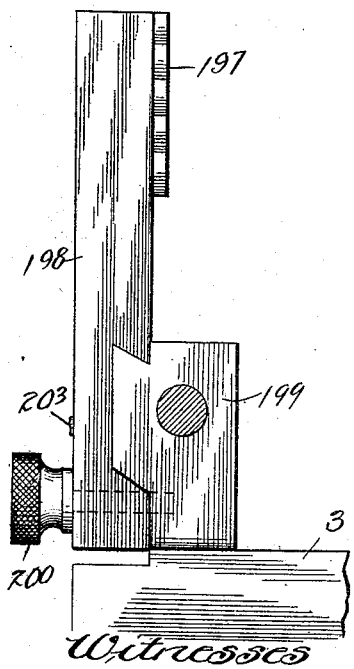
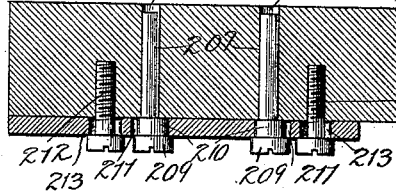
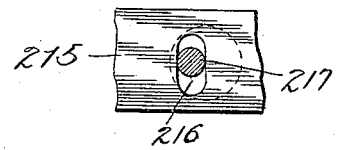
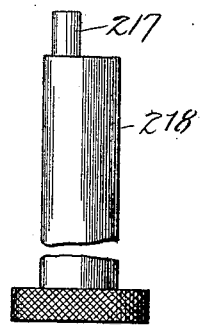
Witnesses
Harry R. Lewhile
M. A. Kiddu
Inventor
Henry H. Hardinge
By [signature] Atty.

H. H. HARDINGE.
TYPE CASTING MACHINE.
APPLICATION FILED JULY 23, 1907.

926,740.

Patented July 6, 1909.
14 SHEETS—SHEET 13.

Witnesses
Harry R. Levlute
M. A. Kiddie

Inventor:
Henry H. Hardinge
By [signature] Atty.

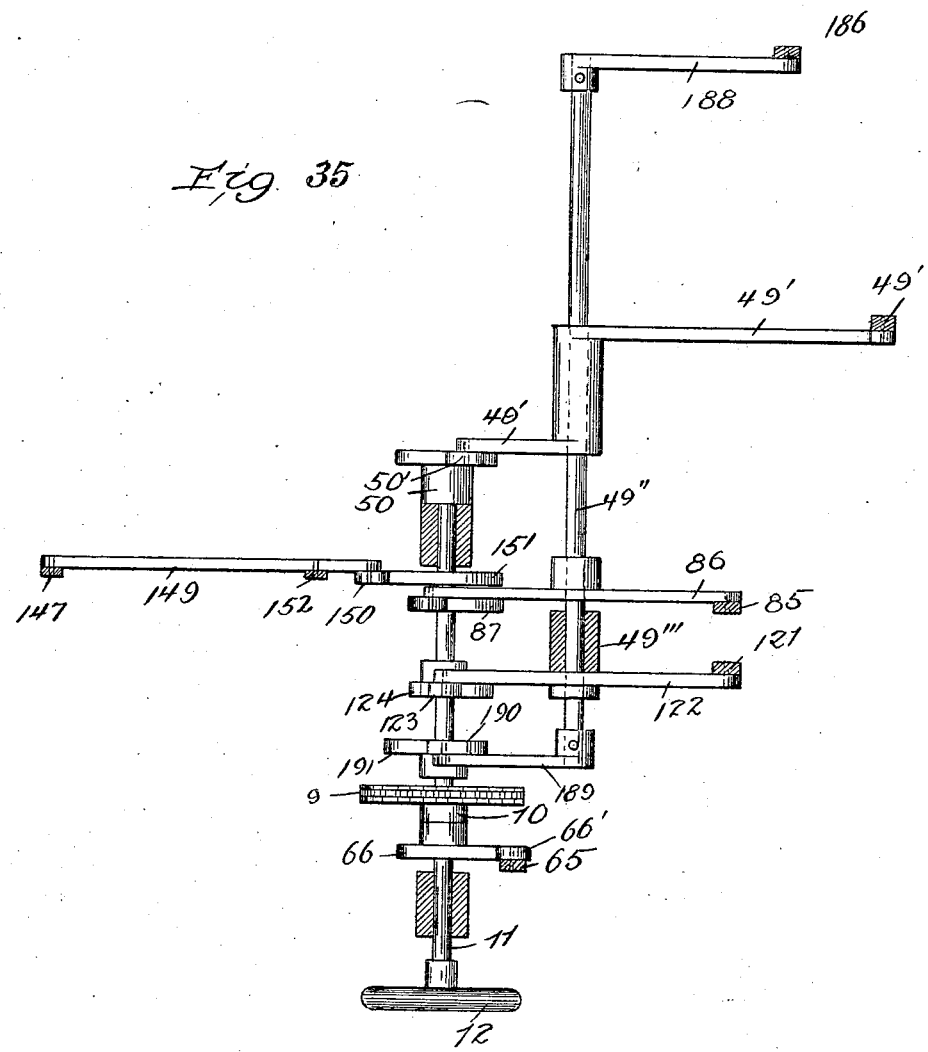

UNITED STATES PATENT OFFICE.

HENRY H. HARDINGE, OF CHICAGO, ILLINOIS, ASSIGNOR TO WIEBKING, HARDINGE & CO., OF CHICAGO, ILLINOIS, A CORPORATION OF ILLINOIS.

TYPE-CASTING MACHINE.

No. 926,740.     Specification of Letters Patent.     Patented July 6, 1909.

Application filed July 23, 1907. Serial No. 385,125.

*To all whom it may concern:*

Be it known that I, HENRY H. HARDINGE, a citizen of the United States, residing at Chicago, in the county of Cook and State of Illinois, have invented new and useful Improvements in Type-Casting Machines, of which the following is a specification.

This invention relates to improvements in machines for casting and finishing type and its object is to provide a pneumatically operated machine of simple but strong and substantial construction which can be manufactured at less cost than machines of this character now on the market and which will operate at high speed with very little noise and produce perfectly formed type.

In the accompanying drawings I have illustrated one embodiment of the invention in which—

Figure 30:
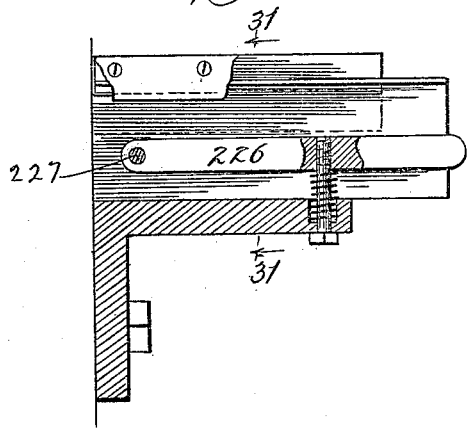
Figure 31:
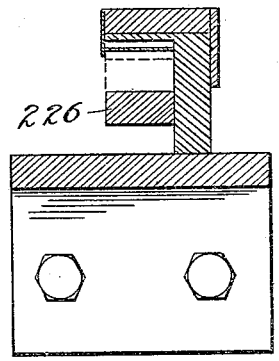
Figure 32:
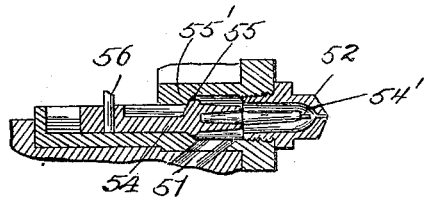
Figure 33:
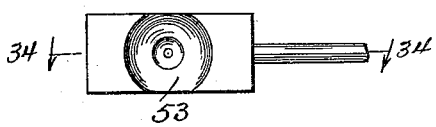
Figure 34:
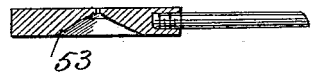

Figure 1 is a front elevation, Fig. 2 is an elevation of the right-hand side of the machine, Fig. 3 is a rear elevation, Fig. 4 is an elevation of the left-hand side of the machine, Fig. 5 is a top plan view, Fig. 6 is a sectional view on the line 6—6 of Fig. 5. Fig. 7 is a sectional view on the line 7—7 of Fig. 5. Fig. 8 is a detail enlarged sectional view on the line 8—8 of Fig. 5. Fig. 9 is a detail sectional enlarged view on the line 9—9 of Fig. 5. Fig. 10 is a detail enlarged sectional view showing the valve mechanism of the choker cylinder. Fig. 11 is a detail enlarged sectional view of the choker cylinder and parts associated therewith. Fig. 12 is a detail enlarged view of the choker arm. Fig. 13 is a side elevation of the mold without the cover. Fig. 14 is a front elevation of the mold without the cover. Fig. 15 is a bottom plan view of the parts shown in Figs. 13 and 14. Fig. 16 is a detail enlarged top plan view, partly in section, of the matrix holder and parts associated therewith. Fig. 17 is a side elevation, partly in section, of the matrix holder and parts connected therewith. Fig. 18 is a detail bottom plan view of the matrix clamping jaws. Fig. 19 is a sectional view on the line 19—19 of Fig. 17. Fig. 20 is a front elevation, partly in section, of the mold cover and parts associated therewith. Fig. 21 is an elevation, a part being broken away, of the parts shown in Fig. 20, looking from the left thereof. Fig. 22 is an inverted perspective view of the receiving end of the roof of the type channel. Fig. 23 is a detail enlarged view showing the shaving knives. Fig. 24 is a sectional view on the line 24—24 of Fig. 23. Fig. 25 is a sectional view on the line 25—25 of Fig. 23. Figs. 26 to 29 are detail views. Fig. 30 is a detail enlarged sectional view showing the type channel and the arm to hold the type stick. Fig. 31 is a sectional view on the line 31—31 of Fig. 30. Fig. 32 is a detail enlarged sectional view showing the choker. Fig. 33 is a plan view of the jet plate. Fig. 34 is a sectional view on the line 34—34 of Fig. 33. Fig. 35 is a plan view, partly in section, showing the operating cams and parts associated therewith.

The drawings show the machine as it appears after a type has been cast, carried down, and is about to be ejected into the type channel and at which time another type is being cast.

The frame of the machine comprises a bed 1 mounted on legs 2 and supporting a casting 3 which is shaped to receive and support many of the working parts of the machine. A power shaft 4 (Figs. 35, 36) is driven by an air engine 5 but as the latter forms no part of the invention it need not be described in detail. An electric motor or other means may be substituted for the air engine to operate the power shaft. A pinion 5' on the power shaft meshes with a gear 6 on a shaft 7 which carries a sprocket wheel 8 (Figs. 1, 3,) and a sprocket chain 9 travels on the sprocket wheel 8 and also on a sprocket wheel 10 on the cam shaft 11 (Fig. 7). The shaft 11 carries the cams which operate the valves hereafter described and it is provided with a crank wheel 12 so that it can be turned by hand when required. The power shaft 5, the shaft 7 and the cam shaft 11 are suitably supported in bearings in the frame.

A melting pot 13 is supported on a bracket 15 rigid with a cylindrical base 16 seated in a cylindrical support 17 (Fig. 7) and adapted to be turned to any desired position therein. The base 16 is adjusted vertically in the support 17 by a screw 18 operating in the bottom of the base. The support 17 is provided with a flange 19 at its top which is arranged to slide on the grooved plate 20 mounted on the bed plate 1, this plate 20 having an opening 20' and the bed plate having an opening 1' to permit movement of the support 17 (Figs. 3, 7). A lever 21 is provided at one end with a slot 21' (Fig. 5) to receive the fulcrum pin 22 on the upper end of a support 22' on the frame and this lever is pivotally engaged with a pin 23 on a lug 23² on the pot 13 (Figs. 3, 7). By operating this lever the melting pot can be pulled back out of operative position so that access can be had to parts of the machine at the front of and in front of the pot. The pot is universally adjustable and it is held securely in proper operative position by a spring locking pin 24 mounted on the bracket 15 and entering an opening 24' in the flange 19 and plate 20 (Fig. 3). The lever 21 is locked by a spring pressed latch 25 which engages a pin 25' on the lever (Fig. 5). The grooved plate 20 has a side projection 26 provided with an elongated slot 26' to receive a locking bolt 27 which extends through said slot and screws into the bed plate 1 (Fig. 3). This plate 20 is adjusted laterally by a screw 28 mounted in the frame and bearing against the projection 26, and after the adjustment is effected the bolt 27 is tightened to lock the plate to the frame (Figs. 3, 4).

The melting pot is cast in two parts, (Figs. 3, 7) the upper and inner part 13' having an extension 29 to receive the metal as it is deposited in the pot and also having a drain opening 30 which is normally closed by a tapered plug 31. The lower and outer part 13'' of the melting pot is securely bolted to the upper and inner part 13' and partly surrounds said upper part. The pump barrel 14 is made rigid with the part 13' of the melting pot and the plunger 32 works in a bushing 33 which is shrunk in the upper end of the barrel 14 (Fig. 7) to facilitate repairing and for changing size of the well without altering the pot. The plunger is carried by a rod 34 which extends upward through a bushing 35 in a yoke 36 rigidly secured to the melting pot (Figs. 3, 7). The plunger rod 34 also projects above the bushing 35 through a bushing 37 in a lever 38 and this bushing 37 is provided with lateral pins 37' which seat on the upper side of said lever. The upper end 34' of the plunger rod is screw-threaded to receive a nut 39 whereby the bushing 37 and the pins thereon may be adjusted vertically on the plunger rod. A spring 40 is arranged on the plunger rod between a loose collar 41 and an adjustable collar 42 on the rod and a removable stop plate 43 is arranged between the collar 41 and the yoke 36 to constitute a rigid stop at the upper end of the spring (Fig. 7).

The pump lever 38 is pivoted at 44 to the upper end of a link 45 which is pivotally mounted at 45' on the melting pot (Figs. 3, 5). The free end of the pump lever carries a plate 38' which overlaps the end of the piston rod 46. This piston rod carries a piston 46' which operates in a cylinder 47 and is pressed in one direction by a spring 47' (Fig. 8). A valve 48 operates in the casing 48' on one side of the cylinder 47 and a pipe 48'' leading from the main air pipe A is connected to said casing (Fig. 9). A link 49 is connected to the valve 48 and to one end of a rock lever 49' which is fulcrumed on a lever shaft 49'' supported in bracket 49''' (Figs. 3, 6, 35). A cam 50 on the cam shaft 11 operates in engagement with a roller 50' on the free end of the lever 49' to impart movement from the cam shaft to the pump valve 48 (Figs. 6, 7, 35).

The pump piston is raised pneumatically and at the same time the springs 40 and 47' are compressed so that when air is exhausted from the cylinder 47 the spring 47' will return the piston to its normal position and the spring 40 will cause the pump piston to force the molten metal through the passage 51, the discharge opening of the nipple 52 and the hole in the jet plate 53 into the mold (Figs. 7, 33, 34). At this time the choker 54 is seated against the seat 55 of the sleeve 55' to prevent metal from the pot flowing through the forward end of the nipple. After the mold is filled the choker is moved forward away from the seat 44 and its needle point 54' will close the opening in the nipple 52. Then on the upward stroke of the pump piston molten metal is drawn down into the passage 51 and pump barrel 14. A rod 56 is connected at its lower end to the choker and at its upper end to an arm 57 which is fulcrumed at 57' on a bracket 58 on the melting pot (Figs. 5, 7). A tension spring 58' is connected at one end to said bracket and at its other end to one end of the choker arm 57. The other end of this choker arm is engaged by an adjusting screw 59 carried by a crank arm 59' (Fig. 5) on a vertical rock shaft 60 supported in bearings on the frame of the machine (Fig. 3). The rock shaft 60 carries a crank arm 60' at its lower end (Fig. 11) which is connected to the piston rod 61 of a piston 62 operating in the cylinder 62'. A spring 61' on the piston rod 61 normally pushes the piston backward in the cylinder. A valve 63 operates in the cylinder head 63' (Fig. 10) on the rear end of the cylinder 62' to control the supply of air which enters the valve chamber through a pipe 64 (Fig. 7) connected with the main air pipe A (Fig. 1). A lever 65 is pivoted on the main frame at 65' and is connected by a link 65'' to the valve 63 (Figs. 7, 10). A cam 66 on the cam shaft 11 operates in engagement with a roller 66' on the choker lever 65 to operate the valve 63 (Fig. 35). When the choker piston is forced outward and forward by the air entering the cylinder 62' the shaft 60 will be rocked to move the adjusting screw 59 into engagement with the end of the choker arm 57 to move the choker back to the position shown in Fig. 7 and after the metal has been forced into the mold, as previously described, the air will exhaust from the cylinder and the spring 61', which is now under tension, will move the piston inward and backward and rock the shaft 60 to carry the choker forward to close the opening in the nipple.

The rod 56 is made of steel to provide the requisite strength necessary for the work to be done, and as the hot metal in the pot will corrode and destroy steel I provide the rod with a cast iron housing 56' within the pot which the hot metal will not affect. I also make the rod 56 longer than necessary so that when the lower end breaks off, due to the weakening and destroying action of the hot metal, the rod can be adjusted downward to again engage the choker.

A burner 67 is supported on the bracket 15 beneath the pump barrel 14 and that part of the melting pot containing the passage 51 (Fig. 7). The burner is provided with a nipple 67' to receive a gas pipe and with a curved jet tube 67'' which produces a flame beneath the nipple 52 and the adjacent end of the sleeve 55'.

The mold comprises the cheeks 68, 68' and the jet blocks 69, 69' fastened to the base 70 to form the space 71 for the type and the space 72 for the jet (Figs. 13, 14). The cheek 68 is provided with enlarged screw holes 73 to receive the screws 73' which secure the cheek to the mold base 70 and an adjusting screw 74 operates in a block 74' and bears upon the cheek 68. A pin 75 is rigidly secured on the cheek 68 to form the nick in the type. One or more of these pins may be provided as required. A box 76 on the mold base carries felt pads 76' saturated with oil to lubricate the mold cover.

The mold body 77 is carried on the end of a shank 78 (Fig. 6) and projects through an opening 77' in the mold base into the type space between the mold cheeks (Figs. 13, 14). The mold body shank is carried on the end of a slide 79 which is pivotally connected to one end of the lever 80, this lever being mounted at 80' on the frame and having its other end pivotally connected to piston rod 81 (Fig. 6). This piston rod is connected to the piston 82 which operates in the cylinder 82' and imparts a forward movement to the mold body. A dash-pot 83 is provided at the forward end of the cylinder to relieve the shock on the return stroke of the piston (Fig. 6). A valve 84 operates in the valve casing 84' at one end of the cylinder 82' (Fig. 6) and a rod 85 is connected to said valve by a cross piece 85' (Figs. 2, 5) and is operated by a lever 86 pivotally mounted on the shaft 49'' and held in engagement with a cam 87 on the cam shaft (Fig. 35). The piston 82 is constantly under the influence of and is moved to its backward position by a spring 88 (Figs. 5, 6) arranged on the bar 89 between the cross bar 89' and a nut 89'' adjustable on said bar. The cross bar 89' is mounted on two rods 90 which also carry a cross head 90'. This cross head carries a micrometer screw 91 which abuts against the end of the bar 89 and is provided on its outer end with a rigid head 91' and a rigid cap 92 which fits loosely on a circular part 92' on the cross head 90'. This circular part is provided with a micrometer scale and by turning the head 91' the screw 91 can be adjusted to limit the return movement of the mold body to control the thickness or set of the type.

The mold cover comprises a cover plate 93 (Figs. 6, 20, 21) carried by a reciprocating carrier 94 which is guided in a channel plate 95 held in place on a pressure plate 96. The channel plate and the pressure plate are secured by a pin 97 against relative movement in a vertical direction. A set screw 98 operating in the pressure plate and bearing upon the channel plate is used to adjust the channel plate relative to the pressure plate. The pressure plate has a cylinder 99 integral therewith which fits in a housing 100 of greater length than the cylinder. A plunger 101 operates in the cylinder 99 against a spring 104 and this plunger is adjusted by a screw 102 in the end 103 of the housing. An ear 105 on the housing is arranged between ears 106 on the pressure plate and set screws 107 are arranged in the ears 106 to bear against the ear 105 and hold the pressure plate and its integral cylinder rigid with relation to the housing, the latter being securely fastened to the frame of the machine. As will be hereafter described the pressure plate holds the mold cover plate snugly against the mold when the type is being cast. The carrier 94 is secured on the end of a piston rod 108 which operates through a stuffing box 109 and carries a piston 110 in the cylinder 111. This piston rod continues up through cylinder head 112 and into speed control cylinder 113 which preferably contains glycerin and which is mounted on supports 114 on the cylinder (Fig. 7). The cylinder is provided with two ports 115 which communicate with a casing 116 in which valve 117 operates. This valve 117 is connected by a link 118 to one end of a lever 119 pivotally mounted at 120 on the frame of the machine (Fig. 1). A rod 121 is connected at one end to the other end of the lever 119 and at its other end to a lever 122 pivotally mounted on the shaft 49'' and carrying a roller 123 which bears against a cam 124 on the cam shaft 11 (Fig. 35).

An adjusting screw 125 operates in a block 126 rigidly secured to the carrier 94 (Figs. 20, 21) and the head of this screw has a recess 125'. This adjusting screw is bored to receive a headed bolt 127 which is screwed into a cross piece 128 movably arranged in a recess 129 in the carrier 94. This cross piece 128 is connected by strap plates 130 with a clamp head 131 below the carrier, the cross piece, straps and clamp head comprising a clamp-frame guided on and movable relatively to the carrier. A clamp jaw 131' is provided on the clamp head. A spring 132 is arranged in the recesses 125' of the adjusting screw 125 and below the head of the bolt 127. An ejector 133 is arranged beneath the carrier 94 and above the clamp head 131 and between the straps 130, and a stud 134 on the ejector is arranged to engage a spring buffer 135 on the clamp 131. A spring-pressed plug 136 in the clamp head 131 bears upward against the ejector and presses the ejector up against the carrier 94. A lock screw 137 operates in the block 126 against the adjusting screw 125 to lock said screw after it has been set. The spring 132 expanding between the head of the adjusting screw 125 and the head of the bolt 127 pulls the clamp frame 131 upward relative to the carrier 94 to hold the type 138 between the clamp jaw 131' and the carrier (Fig. 20). After the ejector has operated, as will be described hereafter, to push the type into the type channel, the spring 132 will pull the clamp frame up relative to the carrier 94 until the cross piece 128 engages the stop formed by the lower end of adjusting screw 125. Air is admitted from an air pipe 139 connected to the main air pipe A to the underside of the piston 110 to carry the carrier 94 and the part connected therewith upward to receive the type which has just been cast in the mold and on the upward movement of the carrier the bolt 127 engages an adjustable stop 127' on the frame of the machine which pushes down the cross piece 128, the straps 130 and the clamp head and opens the clamp jaw to receive said type. On the downward movement of the carrier 94 the spring 132 by expansion pulls the clamp frame upward and the type is thereby securely held in place between the clamp jaw and the carrier until it is ejected as previously described.

The type ejector is operated by a push bar 140 carried by a piston 141 which operates in a cylinder 142, this cylinder being connected with the cylinder 100 by a passage 143 (Fig. 5). A valve 144 operates in a casing 145 at one side of the cylinder 142 and connected therewith (Fig. 4). An air pipe 146 connected to the main air pipe A supplies air to the valve chamber 145. A lever 147 is fulcrumed at 148 on the frame of the machine and is connected at its upper end to the valve 144 and at its lower end to a bar 149 which carries a roller 150 operating in engagement with a cam 151 on the cam shaft 11 (Figs. 6, 35). A link 152 is pivotally suspended from the frame of the machine at 153 and pivotally connected at 154 to the bar 149 and a spring 155 is attached to the link 152 and to the bracket 49'' to hold the roller 150 in operative engagement with the cam 151. It will be observed that air from the cylinder 142 is admitted to the cylinder 100 behind the plunger in cylinder 99 to press the cover plate snugly against the mold when the pump is operated to force metal into the mold, and that this air pressure on the cover plate is relieved when the mold cover moves in either direction.

The matrix 156 (Figs. 16—19) is securely held between the left jaw 157 and the right jaw 157', which jaws are clamped upon the matrix by the screw bolt 158. This screw bolt passes through a bore 160 in the matrix block 161 and this block is secured by a bolt 162 to the matrix slide or holder 163. This slide is arranged to travel on a dove-tailed support 164 (Figs. 1, 19) on the frame of the machine. A spring 165 is arranged on a screw 166 between the matrix block 161 and a plate 167 carried by the slide 163 (Fig. 19) to adjust the block vertically for position relative to the mold. Wedges 168, 168' are arranged between the slide and the matrix block and a screw 169 is arranged in plate 167 and screws into the wedge 168 to adjust the matrix block for side bearing. A spring 170 is arranged on the bolt 169 between the plate 167 and wedge 168 to take up or prevent lost motion when adjusting. The matrix rests on a bottom support 156' carried by the block 161. The matrix slide is operated by a lever 171 which projects through openings in the slide and the support and is provided with a pivoted head 172. A removable filler block 173 is arranged between the head 172 and the matrix block and securely holds the head between itself and the projection 174 on the slide. The lever 171 is carried by the piston rod 175 (Fig. 8) which passes freely through an opening 176 and a guide plug 177 in a column 178 which carries the pump cylinder 47. This piston rod 175 carries a piston 179 which operates in a cylinder 180 mounted on the column 178. A spring 181 is arranged between the plug 177 and the piston to return the piston and the matrix slide to initial position after they have been operated. A valve 182 is arranged in a cylinder head 183 on the cylinder 180 and air is admitted to the cylinder head through a pipe 184 connected to the main air pipe A. Air enters the cylinder through a port 185. The valve 182 is operated by a link 186 (Fig. 3) which is pivotally connected at 187 to a rock arm 188 mounted on the shaft 49'' (Fig. 3). Another arm 189 mounted on said shaft 49'' carries a roller 190 which operates on a cam 191 on the cam shaft. A spring 192 is connected to the arm 188 and to a fixed part on the frame of the machine to hold the roller on the cam.

The type is carried between the clamp jaw and the carrier 94 from the mold into position to be discharged by the ejector into the type channel 193 (Figs. 6, 23) formed in the main frame of the machine. During this movement of the type the jet is broken off by engaging with the jet breaker 231 (Fig. 7). The roof 194 of the receiving end of this type channel is shown inverted in Fig. 22 and it is provided with a pin 195 on its exposed face to receive the nick of the type and guide the type in the channel. As the type is carried down into position in front of the ejector it passes between two side knives 196 and 197. The knife 196 is adjustably fastened to the frame of the machine like the knife 206 as hereafter described. The knife 197 is carried by a block 198 which is adjustably mounted on the support 199, having tapered connection therewith for ease in removing and rigidity in holding (Fig. 24). The support 199 is rigid with the frame of the machine. The block 198 is fastened in adjusted position on the support 199 by a thumb screw 200 which operates through a slot 201 in the block and screws into the support (Fig. 24). The knife 197 is adjusted relative to the knife 196 and in precise relation to the particular type being cast by adjusting the gage 202 on the block 198 relative to the gage 203 on the support 199 and projecting through slot 204 in the block (Fig. 23). A type of the kind to be cast may be placed between the two gages 202, 203, the thumb screw 200 loosened and the block adjusted relative to the support until the type is held snugly between the two gages after which the thumb screw is tightened. This will adjust the knife 197 relative to the knife 196 so that in the passage of the type between said knives it will be shaved on its two sides. A knife 205 is rigidly fastened to the frame of the machine at the top of the channel 193 and a knife 206 is arranged at the bottom of the channel (Fig. 23). Pins 207 are arranged in openings 208 in the frame of the machine and are provided with screw heads 209 and eccentric headed pins 210, the latter operating in openings 211 in the knife 206 (Fig. 25). Screw bolts 212 operate through slots 213 in the knife 206 and are screwed into the frame. The knife 206 can be adjusted by operating the eccentric pin 207 and after it has been properly adjusted the knife is secured rigidly in place by the screws.

The base 215 of the type channel (Fig. 6) is provided with a slot 216 to receive the end 217 of an eccentric adjusting device 218 (Fig. 1, 28) by means of which the base of the type channel may be adjusted longitudinally. The base 215 is supported by two blocks 219, 220 (Fig. 6) arranged one upon the other and provided with inclined engaging surfaces 221 so that the two blocks act as a pair of wedges sliding one upon the other. The block 220 is rigid with the base 1 of the machine and the block 219 is movable relative to the block 220. An operating rod 222 is attached to block 219 and it projects through the front of the machine and has a threaded end 222'. This threaded end operates in an adjusting nut 223 held in a casing 224 on the frame of the machine so that by adjusting the nut the rod is moved lengthwise and the block 219 is adjusted on the block 220 to raise or lower the base 215 of the type channel.

A type stick 225 (Figs. 6, 30) is supported on a spring-pressed arm 226 pivoted at 227 on the frame of the machine to receive type from the type channel 193.

To reduce the heat of the parts during the casting operation I prefer to provide for a water circulation in the mold base, matrix block and the mold cover carrier and I have shown passages 228 in the mold base (Figs. 13, 14), passages 229 in the matrix block (Figs. 16, 17, 19) and passages 230 in the mold cover carrier (Figs. 20, 21) for this purpose. These passages may be variously arranged and a water circulation maintained therein in any suitable manner.

The machine can be run at a high rate of speed to turn out type very rapidly and perfectly formed. The air pressure is utilized to operate various parts of the machine because it is quick and can be availed of to the best advantage.

What I claim and desire to secure by Letters Patent is:

1. In a type casting machine, the combination of a cylindrical support, a cylindrical base adjustable vertically and movable rotatively in said support, a bracket on said base, and a melting pot on said bracket.

2. In a type casting machine, the combination of a slidably mounted cylindrical support, a cylindrical base adjustable vertically and movable rotatively in said support, a bracket on said base, and a melting pot on said bracket.

3. In a type casting machine, the combination of a grooved plate on the frame of the machine, a cylindrical support, a flange on said support slidably engaged with said grooved plate, a cylindrical base adjustable vertically and movable rotatively in said support, a bracket on the base, a melting pot on the bracket, and a lever fulcrumed on the frame of the machine and engaged with said melting pot to move the support on the grooved plate.

4. In a type casting machine, the combination of a melting pot having a pump barrel therein, a plunger operating in said barrel, a rod carrying said plunger, a spring for forcing the plunger down into the barrel, an air cylinder, a piston operating in said cylinder, a rod connected to said piston, a cam-operated air valve for said cylinder, and means connected to said plunger rod adapted to be operated by said piston rod for raising the plunger out of the barrel.

5. In a type casting machine, the combination of a melting pot having a pump barrel therein, a plunger operating in said barrel, a spring-pressed rod carrying said plunger, a horizontal lever pivotally mounted on the melting pot and engaged with said plunger rod, an air cylinder, a piston operating in said air cylinder, a rod carrying said piston and arranged to engage said lever to raise the plunger out of the pump barrel, and a cam-operated air valve for said cylinder.

6. In a type casting machine, the combination of a melting pot having a pump barrel therein, a plunger operating in said barrel, a yoke on the melting pot, a bushing in said yoke, a lever pivotally mounted on the melting pot, a bushing in said lever, lateral pins on said lever bushing seated on said lever, a rod carrying said plunger and projecting upward through said bushings, the upper end of said rod being screw-threaded, a nut on said threaded end of the rod engaging the lever bushing, a spring on the rod beneath the yoke bushing for forcing the plunger into the barrel, and means to operate the lever to raise the plunger out of the barrel.

7. In a type casting machine, the combination of a melting pot having a pump barrel therein, a plunger operating in said barrel, a yoke on the pot, a rod carrying said plunger and guided in said yoke, means for operating said rod to raise the plunger out of said barrel, a nut screwed on said plunger rod, a collar loose on said rod, a spring operating between said nut and collar to force the plunger down in the barrel, and a stop plate removably arranged between the yoke and the collar.

8. In a type casting machine, the combination of a melting pot having a pump barrel therein, a plunger operating in said barrel, a spring-pressed rod carrying said plunger, a lever pivotally mounted on the pot and engaged with said rod, an air cylinder, a piston in said cylinder, a piston rod to operate said lever and raise the plunger out of the barrel, an air valve for said cylinder, a cam-operated rock lever, and a link connecting said lever to said valve.

9. In a type casting machine, the combination of a choker, an air cylinder, a piston in said cylinder operatively connected to the choker, and a cam-operated air valve for said cylinder.

10. In a type casting machine, the combination of a choker, an air cylinder, a spring-pressed piston operating in said cylinder, a rod connected to the piston, a vertical rock shaft, a crank arm on the rock shaft operated by the piston rod, a choker arm on said rock shaft, and a cam-operated air valve for said cylinder.

11. In a type casting machine, the combination of a melting pot, a sleeve supported in said pot, a choker operating in said sleeve, an air cylinder, a piston in said cylinder operatively connected to the choker, and a cam-operated air valve for said cylinder.

12. In a type casting machine, the combination of a melting pot having a pump barrel therein, a plunger a spring for forcing the plunger in said barrel, a sleeve supported in the pot, a choker operating in said sleeve, there being a passage connecting the pump barrel and the sleeve, means for raising the plunger out of the barrel comprising an air cylinder, a piston in said cylinder, a rod connected to said piston, and a cam-operated air valve for said cylinder, and means for operating the choker comprising an air cylinder, a piston in said cylinder operatively connected to the choker, and a cam-operated air valve for said choker cylinder.

13. In a type casting machine, the combination of a choker, an air cylinder, a piston operating in said cylinder, a rod connected to said piston, said rod being operatively connected to the choker, a spring on the piston rod to move the choker in one direction, and a cam-operated air valve on the cylinder to admit air to the cylinder for operating the choker in the other direction.

14. In a type casting machine, the combination of a melting pot, a choker operating in said pot, a rod in the pot operatively engaged with said choker, and a cast iron housing on said rod above the choker and within the pot to protect the rod from the action of the metal in the pot.

15. In a type casting machine, the combination of a mold base provided with an opening therein, a mold body movable in said opening, a shank carrying said body, a slide carrying said shank, a lever pivotally connected to said slide, an air cylinder, a piston in said cylinder operatively connected to said slide, and a cam-operated air valve for said cylinder.

16. In a type casting machine, the combination of a mold base having an opening therein, a mold body movable in said opening, a lever connected to said mold body, an air cylinder, a piston in said cylinder, a piston rod connected to said lever, and a cam operated air valve for said cylinder.

17. In a type casting machine, the combination of a movable mold body, a slide connected to said body, a bar connected to said slide, a spring on the bar to retract the mold body, a micrometer screw supported in line with the bar to form a stop therefor, a lever engaged with said slide, and fluid pressure means for operating said lever to push the mold body forward, said means comprising an air cylinder, a piston in said cylinder operatively connected to said lever, and a cam-operated air valve for said cylinder.

18. In a type casting machine, the combination of a mold, a guide plate, a carrier reciprocating in said guide plate, a mold cover plate on the carrier, and means for applying air pressure to press the cover plate snugly against the mold while the type is being cast and for releasing said pressure while the cover plate is moving.

19. In a type casting machine, the combination of a mold, a guide plate, a carrier reciprocating in the guide plate, a mold cover plate on the carrier, a pressure plate engaging the guide plate, a spring operating on said pressure plate, and means for admitting air pressure to increase the pressure of said pressure plate.

20. In a type casting machine, the combination of a mold, a guide plate, a carrier reciprocating in the guide plate, a mold cover plate on the carrier, a pressure plate engaging the guide plate, said pressure plate having a cylinder thereon, a plunger in said cylinder, a spring between the plunger and said pressure plate, and means for adjusting the plunger.

21. In a type casting machine, the combination of a mold, a guide plate, a carrier reciprocating in the guide plate, a mold cover plate on the carrier, a pressure plate engaging the guide plate, a housing on the frame of the machine, a cylinder on the pressure plate arranged in said housing, a plunger in said cylinder, a spring in the cylinder between the plunger and the pressure plate, and means for admitting air pressure within the housing and in front of said plunger and cylinder.

22. In a type casting machine, the combination of a carrier, a mold cover plate on the carrier, an air cylinder, a piston in said cylinder, a piston rod connected to the carrier, and a cam-operated air valve on said cylinder.

23. In a type casting machine, the combination of a reciprocating carrier, a mold cover plate on the carrier, a clamp frame guided on and movable relative to the carrier, a clamp jaw on said frame, and a spring operating on said frame to pull the frame relative to the carrier and clamp a type between the jaw and the carrier.

24. In a type casting machine, the combination of a reciprocating carrier, a mold cover plate on the carrier, a clamp frame guided on and movable relative to the carrier, a clamp jaw on the frame, a spring operating to pull the frame relative to the carrier to clamp a type between the jaw and the carrier, and means for adjusting the frame relative to the carrier to accommodate type of different sizes.

25. In a type casting machine, the combination of a reciprocating carrier, a mold cover plate on the carrier, a clamp frame guided on and movable relative to the carrier, a clamp jaw on the frame to clamp a type between itself and the carrier, a screw bolt engaged with said clamp frame, a stop on the carrier, and a spring operating on the screw bolt to pull the clamp frame against said stop and to clamp a type between the jaw and carrier.

26. In a type casting machine, the combination of a reciprocating carrier, a mold cover plate on the carrier, a clamp frame guided on and movable relative to the carrier, a clamp jaw on the frame to clamp a type between itself and the carrier, an adjustable stop on the carrier, a screw bolt engaged with said clamp frame, a spring operating to pull the clamp frame against said stop, and a stop on the frame of the machine adapted to be engaged by said screw bolt to open the clamp jaw.

27. In a type casting machine, the combination of a reciprocating carrier, a mold cover plate on the carrier, a clamp frame guided on and movable relative to the carrier, a clamp jaw on the frame to clamp a type between itself and the carrier, a hollow adjusting screw on the carrier to be engaged by said clamp frame, a screw bolt engaged with said clamp frame and operating in said adjusting screw, a spring on the screw bolt between its head and the head of the adjusting screw, and a stop on the frame of the machine to be engaged by said screw bolt.

28. In a type casting machine, the combination of a reciprocating carrier, a mold cover plate on the carrier, a clamp head, a jaw on the head to clamp a type between itself and the carrier, an ejector operating between the carrier and clamp head to eject the type, and a spring-pressed plug in the clamp head operating against the ejector.

29. In a type casting machine, the combination of a reciprocating carrier, a mold cover plate on the carrier, a clamp head, a jaw on the head to clamp a type between itself and the carrier, an ejector operating between the carrier and clamp head to eject the type, and a spring buffer on the clamp head to return said ejector after a type has been ejected.

30. In a type casting machine, the combination of a reciprocating carrier, a mold cover plate on the carrier, a clamp head, a jaw on the head to clamp a type between itself and the carrier, an ejector operating between the carrier and clamp head to eject the type, a spring-pressed plug on the clamp head bearing against said ejector, a stud on the ejector, and a spring buffer on the clamp head to be engaged by said stud to return the ejector after a type has been ejected.

31. In a type casting machine, the combination of a reciprocating carrier, a mold cover plate on the carrier, a jaw for clamping a type between itself and the carrier, an ejector for ejecting the type, a push bar for operating said ejector, an air cylinder, a piston in said cylinder, a piston rod carrying said push bar, and a cam-operated air valve for said cylinder.

32. In a type casting machine, the combination of a reciprocating carrier, a mold cover plate on the carrier, a jaw for clamping a type between itself and the carrier, an ejector for ejecting the type, a push bar for operating said ejector, an air cylinder, a piston in said cylinder, a piston rod carrying said push bar, an air valve for said cylinder, a lever connected at one end to said valve, a cam, a horizontal bar movably suspended from the frame of the machine and connected to the other end of said lever, and a roller carried by said bar in engagement with said cam.

33. In a type casting machine, the combination of a reciprocating carrier, a mold cover plate on the carrier, a jaw for clamping a type between itself and the carrier, an ejector for ejecting the type, a push bar for operating said ejector, an air cylinder, a piston in said cylinder, a piston rod carrying said push bar, a cam-operated air valve for said cylinder, a pressure plate operating on the carrier, a housing communicating with said cylinder, and a cylinder on the pressure plate operating in said housing.

34. In a type casting machine, the combination of a slide, a block on the slide, a pair of matrix clamping jaws on the block, wedges to adjust the matrix block, and a screw for operating one of said wedges for adjusting the matrix block relative to the mold.

35. In a type casting machine, the combination of a slide, a block on the slide, jaws on the block for clamping a matrix, a lever for operating said slide, a projection on the slide, a pivoted head on the lever, and a filler block removably arranged between said lever head and the matrix block to hold said head between said filler block and said projection.

36. In a type casting machine, the combination of a slide, a block on the slide, jaws on the block for clamping a matrix, a lever for operating said slide, an air cylinder, a piston in said cylinder, a piston rod connected to said lever, and a cam-operated air valve for said cylinder.

37. In a type casting machine, the combination of a support, a block adjustably mounted on said support and having an opening therein, a knife carried by said block, a gage on the block, and a gage on the support projecting through the opening in the block.

38. In a type casting machine, the combination with the frame of the machine, of a knife provided with slots and openings therein, fastening screws passing through said slots and into the frame, and pins operating in said frame and having eccentric heads operating in said openings in the knife.

39. In a type casting machine provided with a type channel, a base for said channel, wedge blocks beneath the base, and means for adjusting one of said wedge blocks relative to the other to adjust the base of the type channel.

40. In a type casting machine provided with a type channel, a base for said channel having a slot at one end thereof, an eccentric adjusting device operating in said slot to adjust the base longitudinally, and means for adjusting said base vertically.

41. In a type casting machine, the combination of a mold, a mold body, a reciprocating mold cover, a pump for forcing metal into the mold, a choker, an ejector, and separate fluid pressure means for operating the mold body, the mold cover, the pump, the choker and the ejector.

42. In a type casting machine, the combination of a mold, a mold body, a spring for moving said mold body in one direction, fluid pressure means for moving the mold body in the other direction, a pump, a spring and fluid pressure means for operating the pump, a reciprocating mold cover, fluid pressure means for operating said mold cover, an ejector, a spring for moving said ejector in one direction, and fluid pressure means for moving said ejector in the other direction.

HENRY H. HARDINGE.

Witnesses:
WM. F. BELT,
M. A. KIDDIE.